United States Patent [19]
Oliver et al.

[11] 3,718,004
[45] Feb. 27, 1973

[54] METHOD FOR MAKING AN UNDERWATER PIPELINE CONNECTION

[76] Inventors: John P. Oliver; Alfred W. Wedel, both of P.O. Box 1212; Paul T. Priesmeyer, P.O. Box 1396, all of, Houston, Tex. 77001

[22] Filed: April 21, 1970

[21] Appl. No.: 30,538

[52] U.S. Cl..................................61/72.3, 166/.5
[51] Int. Cl................................................F16l 1/00
[58] Field of Search .....61/72.1, 72.3; 166/.5; 285/18

[56] References Cited

UNITED STATES PATENTS

| | | | |
|---|---|---|---|
| 3,373,570 | 3/1968 | Hindman | 61/72.3 |
| 3,517,520 | 6/1970 | Hammett | 61/72.3 |
| 3,578,233 | 5/1971 | Meister | 61/72.3 X |

Primary Examiner—David J. Williamowsky
Assistant Examiner—David H. Corbin
Attorney—Hyer, Eickenroht Thompson & Turner

[57] ABSTRACT

A lateral pipeline being laid is connected to a main pipeline lying on the bottom of the ocean by a tie-in assembly that is connected to the lateral line above the surface of the water. The main line is equipped with a stub section of pipeline to which the lateral is to be connected. The angle between the lateral and the main line is measured and from this the tie-in assembly is designed. This assembly also includes two ball and socket type joints that permit limited misalignment between the sections of the tie-in assembly and the stub section of the pipeline connected to the main line and also allows relative rotation between at least two portions of the tie-in assembly. A connector assembly is used to connect the tie-in assembly to the stub pipeline section. An actuator is releasably connected to the tie-in assembly above the surface of the water and lowered with the tie-in assembly into the water to actuate the connector assembly to connect the tie-in assembly and the stub pipeline section. This actuator can then be recovered and used again.

6 Claims, 10 Drawing Figures

PATENTED FEB 27 1973

John P. Oliver
Paul T. Priesmeyer
Alfred W. Wedel
INVENTORS

BY Hyer, Eickenroht
Thompson + Turner
ATTORNEYS

John P. Oliver
Paul T. Priesmeyer
Alfred W. Wedel
INVENTORS

John P. Oliver
Paul T. Priesmeyer
Alfred W. Wedel
INVENTORS

John P. Oliver
Paul T. Priesmeyer
Alfred W. Wedel
INVENTORS

BY Hyer, Eickenroht,
Thompson & Turner
ATTORNEYS

METHOD FOR MAKING AN UNDERWATER PIPELINE CONNECTION

This invention relates generally to a method of and apparatus for connecting one pipeline to another under water. In one of its aspects, this invention relates to a method of and apparatus for determining the angle a lateral pipeline being laid makes with an underwater line to which it is to be connected, which information is used to construct a tie-in assembly. In another of its aspects, this invention relates to such a tie-in assembly for use in connecting a lateral line to an underwater pipeline. In yet another aspect, the invention relates to an actuator for an underwater connector that is used to connect the two adjacent ends of two sections of a pipeline.

The method and apparatus of this invention has utility when connecting any two underwater pipelines, but is particularly useful when connecting a lateral pipeline being laid to a main pipeline already installed on the bottom of the body of water and which is equipped for such a connection. When constructing underwater pipelines, operators may provide for installing lateral branch pipelines at some future time, if and when these branch lines become desirable. Most such provisions include valved branching stub lines installed with the main line.

These branching lateral pipelines may intersect the main pipeline at a wide range of angles, normally not known exactly at time of laying the main pipeline, nor will they be known at the time of laying the lateral pipeline. One of the reasons this angle cannot be predetermined is that as a result of forces developed, for example, by sea currents, possible fouling of the line by ships' anchors and changes of fluid pressures within the lines themselves, the lines move about after installation. In addition, currents alter bottom contours by scour and fill action, and operators sometimes manipulate the lines after installation for various reasons.

Because of the underwater environment, the usual techniques of cutting and fitting cost a great deal and produce poor quality work. This difficulty increases with depth of the water. Preferably, therefore, the amount of work that has to be done under water by a diver in making such a connection should be kept to a minimum. Also, the work that the diver does should, if at all possible, be reduced to mechanical manipulation of tools that do not require any measurements or judgement decisions on his part. For example, it is desirable that the connection between the lateral pipeline and the stub pipeline connected to the main line be accomplished by power actuators that eliminate the need for a diver to make up flange connections and the like under water. It is not that divers cannot do all of this, it is just that this particular work in the past has proved difficult and time consuming when done by a diver. Also, underwater welds are of unknown quality and should be avoided if possible.

It is therefore an object of this invention to provide a method of and apparatus for connecting a lateral pipeline to a stub pipe section on a main pipeline wherein the tie-in connection between the lateral line and the stub pipe section on the main line can be assembled and welded to the lateral line above the surface of the water, after which the lateral line with the tie-in assembly can be lowered into position and connected to the stub pipeline section by a mechanical connector that requires no welding and that can be actuated by an actuator that is powered from the surface and which can be removed and recovered after the connection is completed, if desired.

It is another object of this invention to provide an actuator for an underwater connector for connecting adjacent ends of two pipeline sections that can be releasably attached to one of the pipeline sections above the surface of the water and then lowered with the pipeline section into position to make the connection after which the actuator can be removed again to the surface for use again.

It is another object of this invention to provide a method of and apparatus for determining the angle a lateral pipeline being laid makes with a pipeline already lying on the bottom of the water, which angle can be read at the surface, thereby eliminating the need to use a diver to make such measurement under water.

It is an additional object of this invention to provide a tie-in assembly for connecting a lateral pipeline to a stub section of pipeline attached to a main pipeline that permits limited misalignment between portions of the tie-in assembly when it is attached to the lateral line and the stub section and which also allows relative rotation between portions of the tie-in assembly to facilitate the connecting of the tie-in assembly to the stub section.

It is an additional object of this invention to provide apparatus for and a method of connecting a lateral pipeline being laid to a main pipeline lying on the bottom of a body of water that includes determining the angle the lateral line makes with the main line, raising the lateral line above the surface of the water to permit the tie-in assembly, designed as a result of the angle measurement, to be attached to the lateral line when the lateral line is out of the water, thereby allowing a welded connection that can be inspected or tested to be used, if desired, lowering the lateral line with the tie-in assembly back into the water into position with the end of the tie-in assembly adjacent the end of the stub section, and connecting these adjacent ends together to complete the connection of the lateral line to the main line.

These and other objects, advantages, and features of this invention will be apparent to those skilled in the art from a consideration of this specification, including the attached drawings and appended claims.

Figure 1:
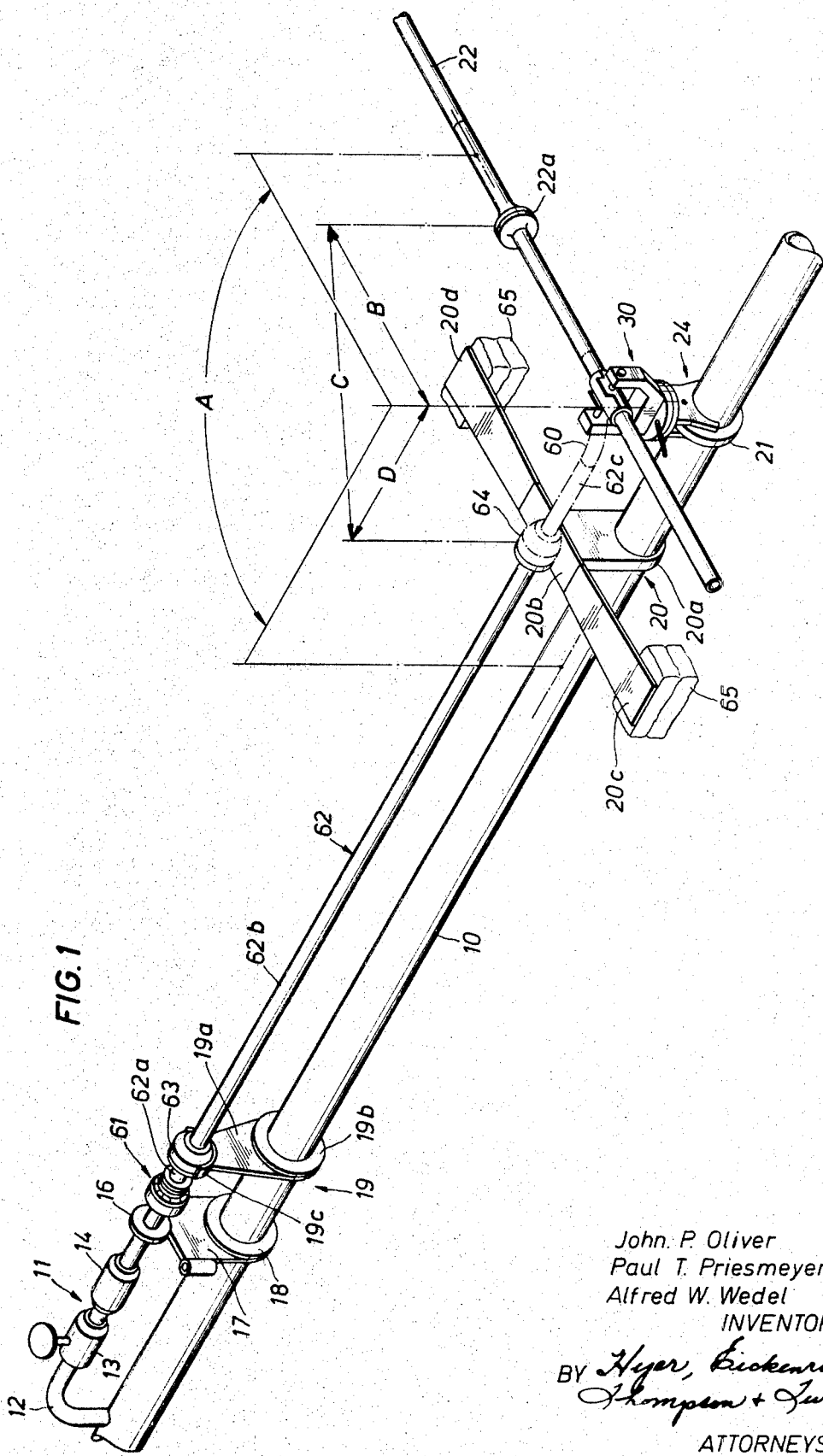
FIG. 1 is a view in elevation of a lateral pipeline intersecting a main pipeline and also showing a tie-in assembly constructed in accordance with this invention in place connecting the lateral pipeline to the main line.

As stated above, operators will often try to anticipate places where future lateral lines will be connected to a main pipeline before the main pipeline is laid. To prepare for this connection to be performed later, the operators will attach a stub section of pipeline to the main line as it is being laid at the point where such a connection is anticipated. As shown in FIG. 1, main line 10 is equipped with stub pipe section 11. This stub section includes elbow 12, valve 13, check valve 14, and connect hub 15, which is not visible in FIG. 1, but which can be seen in FIG. 4. The outer end of the stub section is supported by flange 16, which rests on support plate 17. Usually flange 16 is attached to the support plate by welding the two together. The support plate, in turn, is permanently mounted on main line 10 by attaching the plate to flange 18. In anticipation of employing the method of this invention to connect a lateral line to the pipeline through the stub section, support assembly 19 and support assembly 20 will be attached to the main line before it is lowered into the water. Flange 21 will also be attached to the main line before it is laid. Support assemblies 19 and 20 and flange 21 all cooperate in the tying-in of the lateral pipeline to the main line in a manner to be described below.

When the time comes to lay a lateral line and to connect this line to the main line, the line will be directed so that it will cross the main line at the location of flange 21. The angle that the lateral line makes with the main line at this point of intersection will have to be measured after the line is laid because it it difficult, if not impossible, to predict what this angle will be. Therefore, the lateral line is laid until it extends across the center line of main line 10 and after which the angle A between lateral line 22 and main line 10 will be measured.

Figure 10:
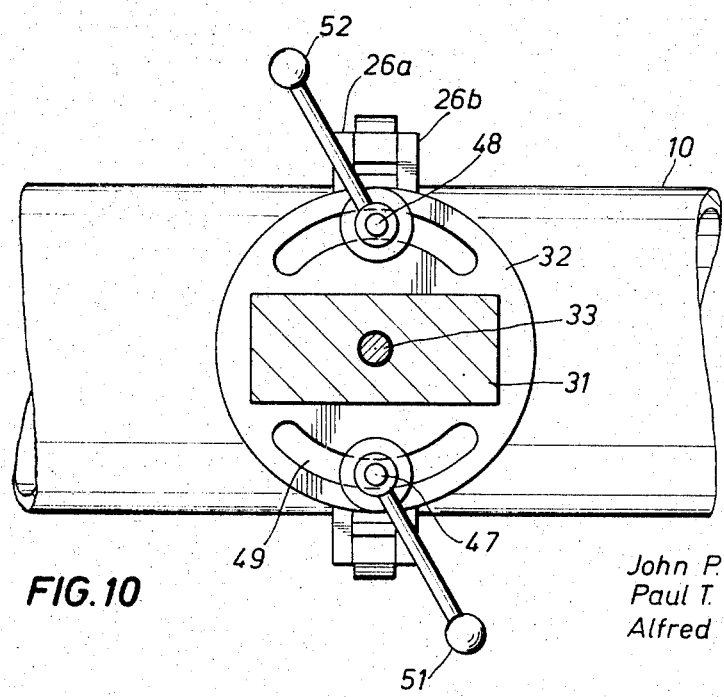
FIG. 10 is a view taken along line 10—10 of FIG. 9.
Figure 8:
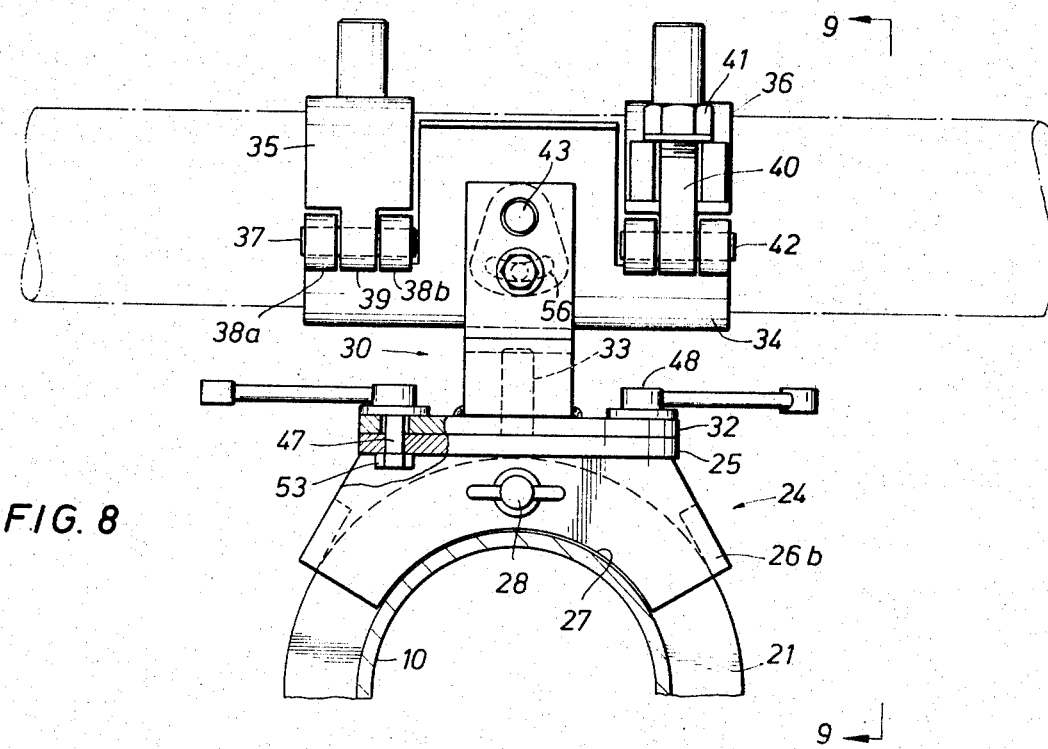
FIG. 8 is a side view in elevation of the apparatus used to measure the vertical and horizontal angles between the lateral pipeline and the main pipeline.
Figure 9:
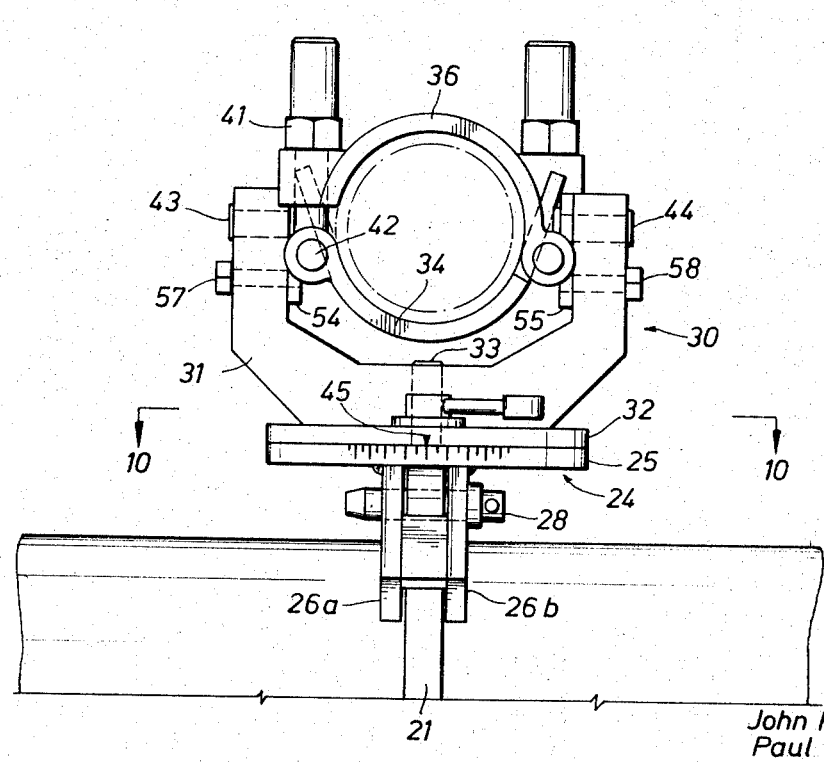
FIG. 9 is a side view of this apparatus taken along line 9—9 of FIG. 8.

In accordance with one aspect of this invention, means are provided for determining the angle between the lateral pipeline 22 and main pipeline 10 that do not require this angle to be measured by a diver under water. The preferred embodiment of the apparatus for so measuring this angle is shown in FIGS. 8, 9, and 10, as well as in FIG. 1. The apparatus includes a first member 24 comprising circular plate 25 and downwardly extending parallel spaced mounting plates 26a and 26b. Each mounting plate has a curved surface, such as surface 27 on plate 26b, as shown in FIG. 8, to engage the outside surface of main line 10. The plates are spaced apart so as to receive between them flange 21. Removable pin 28 extends through mating holes in he plates and flange 21 to anchor first member 24 to the flange and main line 10.

The apparatus also includes second member 30, which is pivotally connected to first member 24 for relative pivotal movement around an axis that is perpendicular to the longitudinal axis of the main line. In the embodiment shown, second member 30 includes U-shaped support bracket 31, which is attached to flat, circular plate 32, so that the arms of the U-shaped supporting bracket extend away from the plate. Stub shaft 33 has one end attached to plate 25 and extends upwardly through openings in plate 32 and supporting bracket 31. Supporting plate 32 and bracket 31 are free to rotate around the longitudinal axis of shaft 33 to a limited extent, as will be described below. The longitudinal axis of shaft 33 is perpendicular to the longitudinal axis of the main line when the first member is attached to flange 21 by pin 28.

Positioned between the arms of the U-shaped bracket is saddle 34, which is arcuate in cross section, preferably having a radius of curvature such that it will snugly fit the outside diameter of lateral pipeline 22. Arcuate straps 35 and 36 each have one end hinged to one side of saddle 34 and the other end arranged to be connected to the other side of the saddle to clamp the saddle to lateral pipeline 22. In the embodiment shown, strap 35 is hinged to saddle 34 by hinge pin 37 which extends through openings in ears 38a and 38b on the saddle and ear 39 on the strap. Strap 36 is hinged to the saddle at the other end and on the opposite side in the same manner. The other end of strap 36 has a slot in which bolt 40 can be positioned, when nut 41 has been loosened sufficiently. One end of bolt 40 is pivotally connected to saddle 34 by pin 42. By swinging strap 36 over the top of line 22, bolt 41 can be moved into the slot at the end thereof, and nut 41 tightened to clamp the line in the saddle. Strap 35 can be secured around the pipe in the same manner at the other end of the saddle. Saddle 34 is supported between the upwardly extending arms of U-shaped bracked 31 by trunnions 43 and 44.

In accordance with one aspect of this invention, means are provided for measuring the horizontal angle between the lateral pipeline and the main pipeline, and also means are provided for measuring the vertical angle between these same two pipelines. In the apparatus just described, with first member 24 mounted on flange 21 of the pipeline, plate 32 is rotated relative to plate 25 to align saddle 34 to receive lateral line 22. The outer peripheral surface of plate 25 is provided with a scale, and plate 32 is provided with index marker 45 to indicate the angle through which plate 32 had to be rotated to align saddle 34 with the longitudinal axis of the lateral line. So that the diver will not have to read the angle indicated on the scale, means are provided to lock the relative position of the first and second members of this apparatus so that it can be raised to the surface and read there. In the embodiment shown, bolts 47 and 48 extend through holes provided in plate 25 and through arcuate slots 49 and 50 in plate 32. Handles 51 and 52 have their ends connected to the heads of bolts 47 and 48, respectively, so that the bolts can be rotated easily by manipulating these handles. The lower end of each bolt engages the threads of a nut attached to the lower side of plate 25. Only nut 53 is shown (FIG. 8). Thus by manipulating handles 51 and 52 to loosen bolts 47 and 48, circular plates 25 and and 32 are free to rotate relative to each other within the extent of slots 49 and 50. After saddle 34 has been moved into alignment with the lateral line and it has been strapped into the saddle, handles 51 and 52 can tighten bolts 47 and 48 to prevent further relative rotation between plates 25 and 32. Then by pulling pin 28, the entire apparatus can be raised to the surface with lateral line 22 and the angle between the main line and the lateral line will be indicated by the position of index 45 relative to the scale on plate 25.

As stated above, means are also provided to measure the vertical angle between the two pipelines. For this purpose, in the embodiment shown, plates 54 and 55 are fixed to trunnions 43 and 44 for rotation therewith as saddle 34 is pivoted on the trunnions to receive lateral line 22. Each such plate is provided with an arcuate slot, such as arcuate slot 56, as shown in plate 55 in FIG. 8. Bolts 57 and 58 are positioned to extend through the arms of U-shaped bracket 31 and through these slots. As described above in connection with bolts 47 and 48, bolts 57 and 58 can be loosened to allow the saddle to be pivoted with the trunnions until it is at the proper angle to receive lateral line 22. Bolts 57 and 58 can then be tightened and the vertical angle between the lateral line and the main line can be measured after the apparatus has been raised above the surface of the water with the lateral line.

After the horizontal angle between the lateral and main lines has been determined, along with the vertical angle if this is desired, a tie-in assembly can be constructed that will connect lateral line 22 with the end of stub section 11. All of the distances and angles are now known. The distance from flange 21 and the end of stub section 11 was measured and recorded when the main line was laid, as were all other pertinent measurements. The position of the angle measuring apparatus on the line provides a reference point indicating where the two lines intersect.

Another method of determining angle A is by triangulation. First the distance B from a reference point on lateral line 22, say flange 22a, to the point of intersection at flange 21 is measured. Next the distance C is measured from the reference point to a point on the main line a known distance D from flange 21, say support assembly 20. Now with three sides known, angle A can be calculated. These measurements have the disadvantage that they have to be determined by a diver.

As shown in FIG. 1, the tie-in assembly constructed will include elbow 60, which is designed in accordance with the measured angles between the lateral line and the main line. The elbow is designed to change the direction of the lateral line a direction in general axial alignment with the longitudinal axis of the stub section. On the other end of the tie-in assembly is connector 61 for connecting the tie-in assembly to the end of the stub section. Also included is a pipe section 62, which extends from the end of elbow 60 to the connector and includes means, located between the connector and the elbow, to allow limited misalignment between the portion of the pipe section connected to the elbow and the portion connected to the connector. Preferably, two such means are provided, and further, such means are arranged to allow relative rotation between the portions 62a, 62b, and 62c of pipe section 62 that are on opposite sides of said means. In the embodiment shown, such means comprise swivels 63 and 64, which to allow the above-described misalignment and rotation between the various portions of pipe section 62. Any means that will allow this type movement can be used; preferably a ball and socket type joint is used that will allow unlimited rotation between the portions of pipeline connected to the joint and which will allow substantial, but limited, misalignment between the two portions.

As shown in FIG. 1, support assemblies 19 and 20 are located to support swivels 63 and 64, respectively, when the tie-in assembly is in place connecting the lateral line to the stub section. Support assembly 19 includes support plate 19a, which is connected to flange 19b on line 10. A flat, horizontal plate 19c is attached to the top of support plate 19a and has an arcuate surface to engage the arcuate exterior of swivel 63.

Since these pipelines tend to move for various reasons, it is important that the connection between lateral line 22 and main line 10 be arranged to tolerate some relative movement between the lines after they are connected. Swivel 63 and 64, of course, are provided for that purpose, among others. If swivel 64 were allowed to lie on top of main line 10, however, it is possible that for some reason if lateral line 22 contracted, the portion of the line containing swivel 64 and elbow 60 could drop to the ground to the side of the main line. Then if the line wanted to move back to its original position, it would be trapped against the side of the main line and could not do so. To avoid this possibility, support assembly 20 is positioned to support swivel 64 and to allow lateral line 22 to move axially a considerable distance without causing elbow 60 to drop down to one side of the main line.

In the embodiment shown, support assembly 20 includes lower support plate 20a, which is attached to maine line 10, top plate 20b, and side plates or wings 20c and 20d. The side plates are preferably pivotally attached to the ends of top plate 20b so they could be adjusted to various heights as desired. Sandbags 65 are placed by a diver to support the outer end of the side plates at the desired height.

Figure 7:
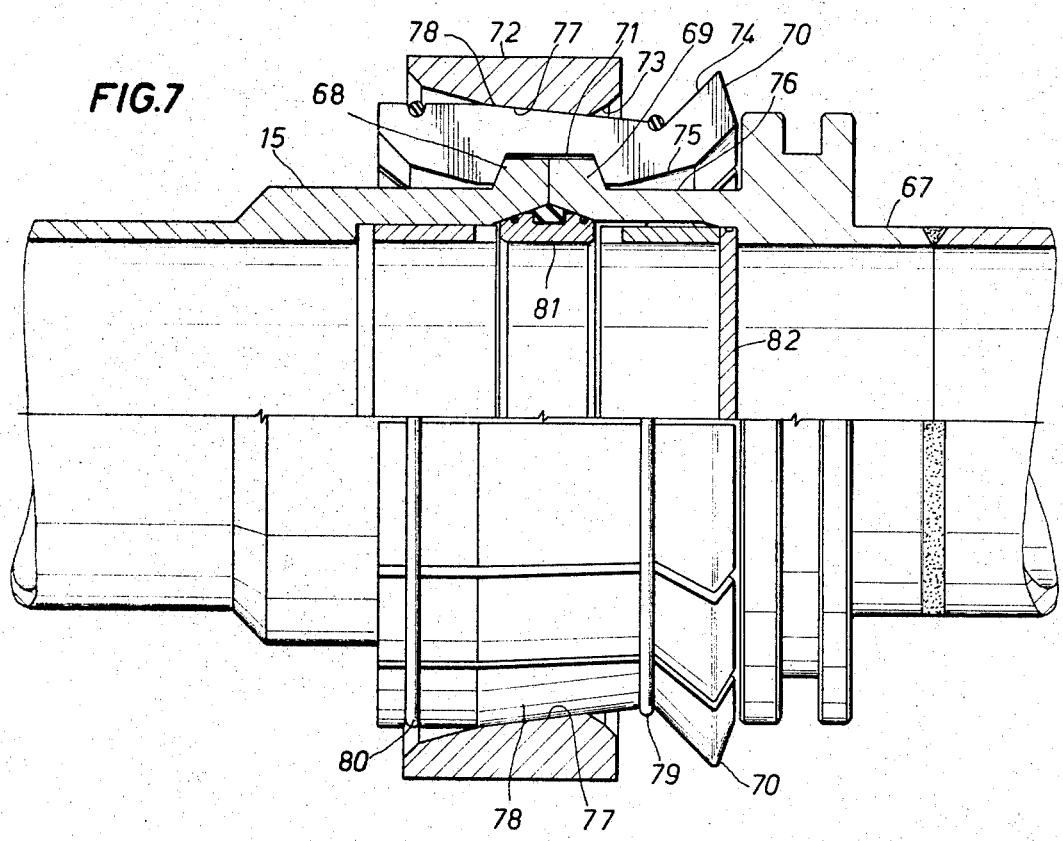
FIG. 7 is a view partially in elevation and partially in section of the connector connecting the end of the stub section to the end of the tie-in assembly.

Means are provided for connecting the end of the tie-in assembly with the end of stub section 11, after the lateral pipeline 22 with the tie-in assembly connected is lowered back into the water into position with the end of the tie-in assembly adjacent to the end of stub section 11. In the embodiment shown, the connector includes connector hub 15, which is attached to the end of stub section 11, and connector hub 67, which is connected to the end of the tie-in assembly. The connector hubs have annular flanges 68 and 69, respectively, that abut each other when the connectors are in axial alignment and in engagement, as shown in FIG. 7.

The connector also includes holding means for engaging the two connector hubs to hold them in abutting axial alignment. In the embodiment shown, the holding means includes a plurality of individual fingers 70 that are spaced around the exterior of the connector hubs. Each finger has groove 71 designed to engage flanges 68 and 69 on the connector hubs and hold the connector hubs in engagement and in axial alignment. Fingers 70 are carried on connector hub 67 when the tie-in assembly is lowered into position to make the connection. Before the connection is made, locking ring 72 is positioned axially to the right, as viewed in FIG. 7, far enough for inclined surface 73 on the actuator ring to engage inclined surfaces 74 on the holding fingers. This movement causes the fingers to pivot until surface 75 on the bottom of each finger has moved into engagement with the outer surface 76 of connector hub 67. When so pivoted, the outer ends of the fingers will be spread apart for connector hub 67 to be moved into engagement with connector hub 15, as shown in FIG. 7. Then by moving locking ring 72 to the left, as viewed in FIG. 7, inclined surface 77 on the locking ring will engage surface 78 on the fingers and cause them to pivot into the position shown in FIG. 7 with grooves 71 on the fingers in holding engagement with annular flanges 68 and 69 on the connector hub. The taper of surfaces 77 and 78 are such that the friction between them will hold locking ring 72 in position to keep the fingers from moving out of engagement with the connector hubs, even though axial forces are imposed on the two lines tending to pull the connector hubs apart or to move them laterally of each other. Rubber "O" rings 79 and 80 are shown encircling fingers 70. These rings help as the fingers are assembled around connector hub 67. Thereafter, they play no part in the function of the fingers.

Seal ring assembly 81 is carried by connector hub 67 as the connector hub and tie-in assembly are lowered into position to be connected with stub section 11. This seal ring assembly is designed to engage inside tapered surfaces of the two connector hubs and for a fluid tight seal therebetween, as shown in FIG. 7.

Preferably, connector hub 67 is equipped with rupture disk 82, or the like, to keep the lateral line and tie-in assembly from filling up with water before the completion of the connection of the lateral line to the main line stub section. A similar rupture disk could be installed in connector hub 15, but the small amount of water between valve 13 and the end of stub section 11 generally is not considered sufficient to require this.

In accordance with one aspect of this invention, an actuator is provided for moving connector hubs 15 and 67 into engagement and for actuating the holding means of the underwater connector employed to connect the two connector hubs together. It is another feature of the invention that the major portion of the actuator can be retrieved and used again with other connectors.

Usually, the actuator will be required not only to actuate the connector, but to move one of the connector hubs axially to move it into engagement with the other before the connection can be completed. This movement is required because the length of the tie-in assembly will be designed so that when lowered into position into axial alignment with the stub section of line to which it is to be attached, therewill be a short space between the connector hubs. With the type of connector described above, of course, a short axial movement of connector hub 67 is required in order to move holding finger 70 axially into position to be pivoted into holding engagement. Usually this distance will be designed such that it is in the order of about seven inches of axial travel.

In the embodiment shown, the actuator, which is best seen in FIGS. 2 through 6, includes frame means generally indicated by the number 85. The frame means includes transverse mounting plate assemblies 86 and 87 that are connected together in parallel-spaced relationship by elongated side member assemblies 88 and 89. The assemblies include various gussets and stiffening members as required to provide the desired rigidity and strength.

Figure 4:
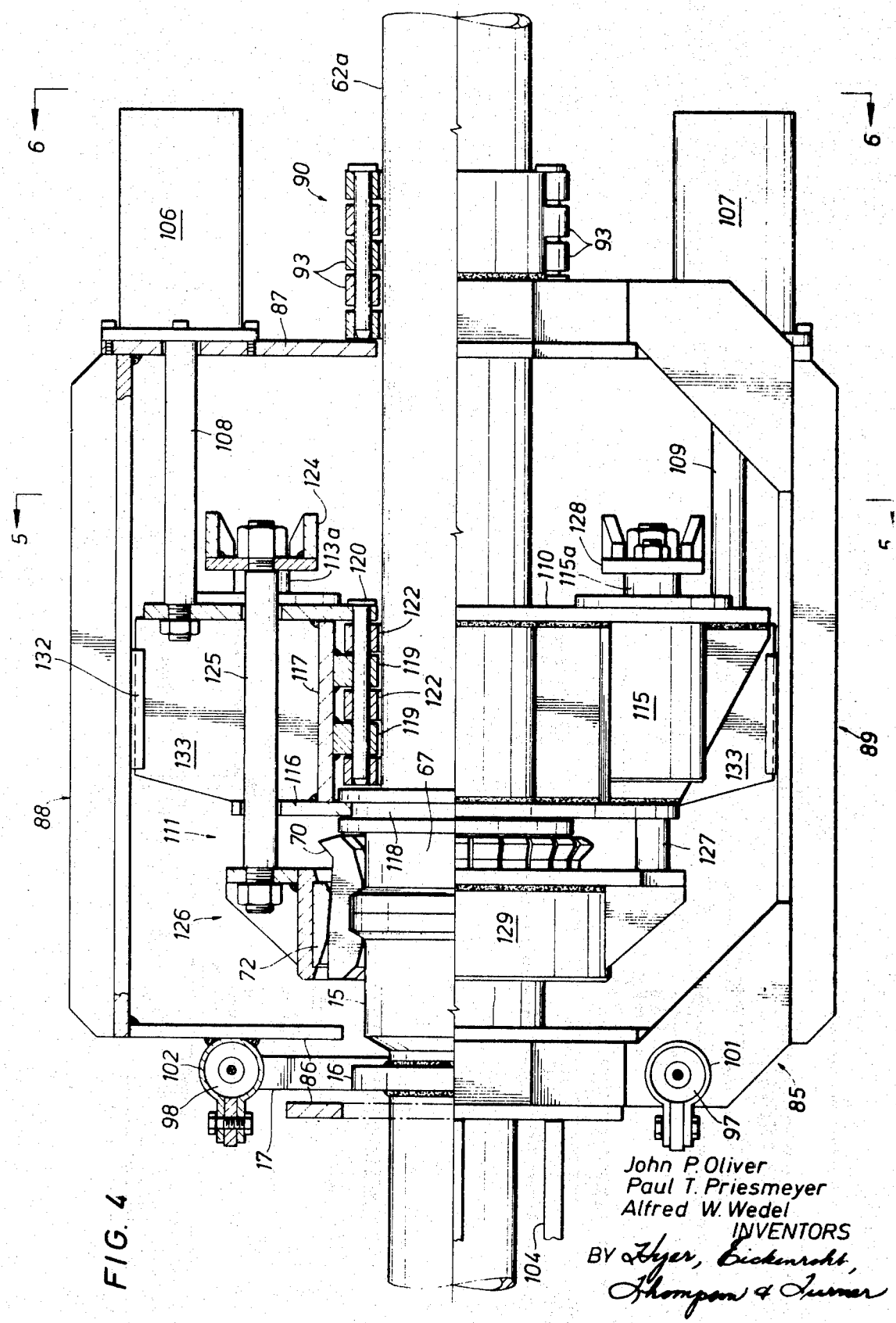
FIG. 4 is a top view partially in elevation and partially in section of the connector and actuator assembly.
Figure 6:
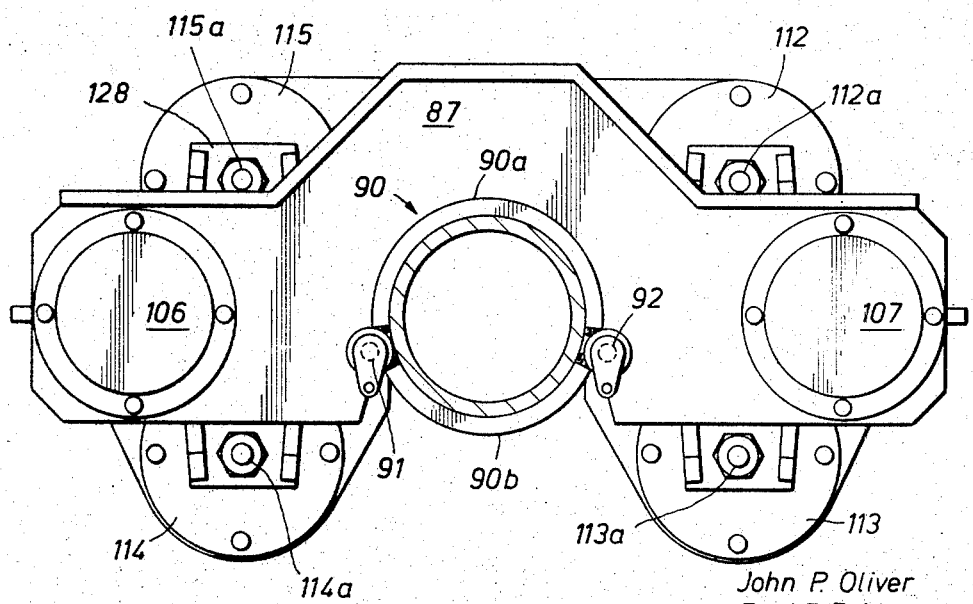
FIG. 6 is a sectional view taken along line 6—6 of FIG. 4.

The frame means is releasably attached to portion 62a of pipe 62 by support 90, as shown in FIGS. 4 and 6. Support 90 includes an upper half 90a and a lower half 90b. The two halves are connected together by removable pins 91 and 92 which extend through ears 93 that are in alignment and alternately connected to one or the other of the sections of the support.

Figure 2:
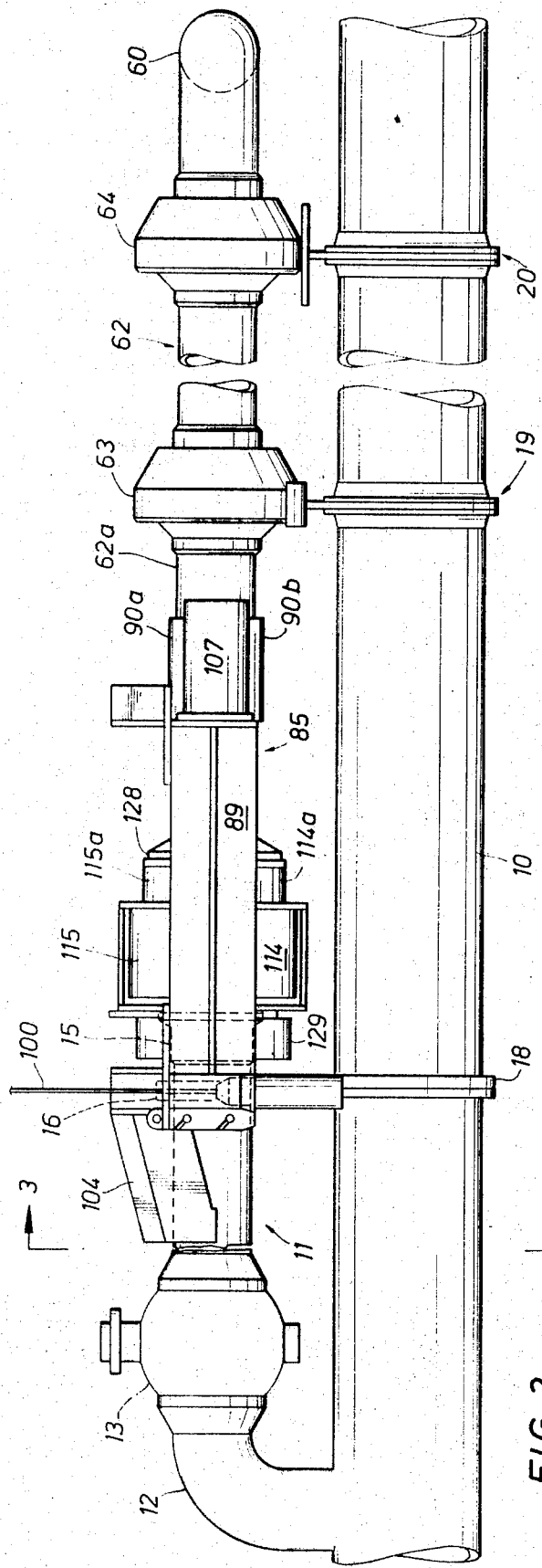
FIG. 2 is a side view in elevation of the short stub section of the main line with the tie-in assembly connected to the end of the stub section (in the drawing the actuator for the connector has not been retrieved)
Figure 3:
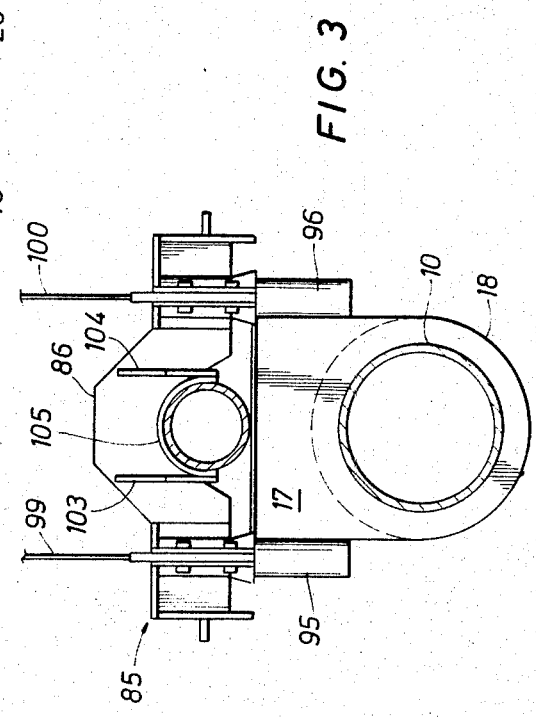
FIG. 3 is a sectional view taken along line 3—3 of FIG. 2.

The actuator is lowered into a base. In the embodiment shown, the base comprises base plate 17 and flange 18, which are attached to main pipeline 10 when the pipeline is being laid, as described above. This base is positioned relative to connector hub 15 so that when the frame means of the actuator is lowered into position on the base, the two connector hubs will be in proper alignment to be connected together. The base includes sleeves 95 and 96, as shown in FIG. 3, which are attached to opposite sides of base plate 17. Wire line anchors 97 and 98 are inserted in sleeves 95 and 96 and anchored therein in any convenient manner. Attached to the wire line anchors are flexible lines 99 and 100, respectively. These lines extend to the surface and serve to guide the connector and actuator assembly into position on the base when the lateral line and tie-in assembly is lowered into position to be connected into the main line. The flexible lines are threaded through guide sleeves 101 and 102 attached to the forward end of frame means 85 for this purpose. Guide sleeves 101 and 102 are also designed to snugly fit the top of wire line anchors 97 and 98 and anchor the frame means of the actuator against lateral movement when the actuator is positioned on the base, as shown in FIGS. 2, 3, and 4.

Additional support for the frame means of the actuator is provided by support assembly 19, which engages swivel 63, and supports the end of portion 62a of pipe 62. In addition, arms 103 and 104 extend forwardly from front mounting plate 86 of the frame means and position arcuate member 105 to engage stub section 11.

Figure 5:
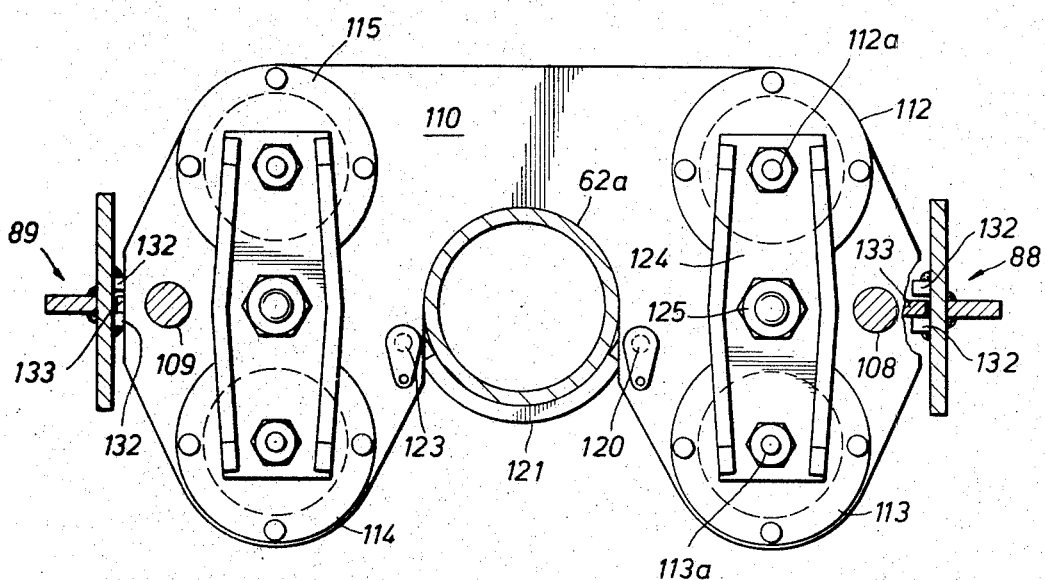
FIG. 5 is a sectional view taken along line 5—5 of FIG. 4.

As stated above, when the frame means of the actuator assembly is lowered into position on the base, the two connector hubs will be a few inches apart, but in axial alignment. Therefore, the actuator includes means to move connector hub 67 axially into engagement with connector hub 15. In the embodiment shown, fluid cylinders 106 and 107 are mounted on mounting plate 87 of the frame means. Piston rods 108 and 109 of cylinders 106 and 107, respectively, are attached to intermediate transverse plate 110. Intermediate transverse plate 110 comprises part of movable cylinder support assembly 111, which is designed to support four fluid cylinders. The cylinders are arranged in pairs on each side of pipeline 62a. As shown in FIG. 5, cylinders 112 and 113 are positioned on the righthand side and cylinders 114 and 115 are on the lefthand side. Cylinder support assembly 111 includes, besides intermediate mounting flange 110, flange or yoke 116, and arcuate spacer member 117. Yoke 116 has an arcuate surface on its underside designed to engage annular groove 118 on connector hub 67. The arcuate surface in yoke 116 extends only part-way around the annular groove and is designed so that it can be moved vertically out of engagement with the annular groove, the actuator to be raised to the surface after the connection has been completed. Assembly 111 is attached to pipe section 62, however, for the lowering-in step. Spacer member 117 is arcuate in cross section, extending around the top half of pipe section 62a. Attached to the inside of spacer member 117 are lugs 119. These lugs have inline holes through which hinge pin 120 can be inserted. A second arcuate member 121 is provided with ears 122 that are positioned on opposite sides of lugs 119 and which also have openings through which hinge pin 120 can extend. Thus, lower arcuate member 121 is hinged to spacer member 117 on one side by hinge pin 120. A similar arrangement is provided on the other side, and hinge pin 123 connects the two members together on that side. By removing either of these hinge pins, assembly 111 will be free for removal upwardly away from pipe section 62a.

The assembly just described operates to move hub 67 axially into engagement with hub 15. This is accomplished as follows. With the frame means of the actuator in engagement with the base and therefore held against lateral movement, fluid cylinders 106 and 107 can move cylinder support assembly 111 laterally to the left as viewed in FIG. 4 and, through the engagement of yoke 116 in groove 118, move connector hub 67 axially to the left into engagement with connector hub 15.

Cylinder support assembly 111 is supported for movement relative to frame means 85 by spaced horizontal lugs 132 mounted on side assemblies 88 and 89 of the frame. The lugs on each side assembly are spaced apart to receive and slidingly support plates 133 attached to the support assembly.

When so positioned, the connector hubs are ready to be connected together. Cylinders 112-115 are employed for this purpose. As shown in FIG. 5, piston rods 112a and 113a both are connected to plate 124. In between the cylinders is rod 125, which has one end connected to plate 124 and extends through plates 110 and 116. Its other end is connected to connector actuating assembly 126. On the other side, piston rods 114a and 115a are connected to rod 127 through plate 128. By supplying these cylinders with fluid pressures, their combined power outputs can be transmitted to connector actuating assembly 126 through rods 125 and 127.

Movement of connector activating assembly 126 to the left moves connector locking ring 72 to the left and pivots locking fingers 70 into engagement with the annular flanges on the connector hubs, in the manner described above. Connector actuator assembly 126 includes member 129, which has internal configuration such that it will engage locking ring 72 and move it axially as actuator assembly 126 is moved axially. Member 129, however, does not encircle locking ring 72 to the extent that it cannot be removed out of engagement therewith by vertical movement. Therefore, after the connector has been actuated and locking ring 72 has moved to cause locking fingers 70 to be moved into the holding position shown in FIG. 4, the actuator assembly except for the base can be released from the tie-in assembly and recovered for use again. This cannot be done, however, until one of hinge pins 91 or 96 and one of hinge pins 120 and 123 have been removed by a diver releasing the actuator from pipe 62a.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, what is claimed is:

1. A method of connecting a first underwater pipe line lying on the bottom of a body of water to a second underwater pipeline that intersects the first pipeline comprising connecting a short stub section of pipeline to the first pipeline, positioning the second pipeline to intersect the first pipeline at a point a known distance from the end of the stub section of pipeline, measuring the horizontal angle the second pipeline makes with the first pipeline at the intersection of the first and second pipelines, raising the second pipeline above the surface of the water, attaching one end of a tie-in assembly to the end of the second pipeline that has been designed in accordance with the measured angle and said known distance to have the necessary length and configuration to extend between the end of the second pipeline and the end of the stub section of pipeline when the second pipeline has been lowered back to the bottom of the water, lowering the second pipeline and the connected tie-in assembly into position in the water, and connecting the other end of the tie-in assembly to the end of the stub section.

2. The method of claim 1 including the further step of measuring the vertical angle the second pipeline makes with the first at the intersection of the first and second pipelines.

3. The method of claim 1 in which the angle measuring step includes measuring the distances from a reference point on the second pipeline to the point of intersection and to a reference point on the first pipeline a known distance from the point of intersection to obtain three sides of a triangle from which the horizontal angle between the first and second pipelines can be determined.

4. A method of connecting a laterally extending pipeline to a main pipeline lying on the bottom of a body of water, the main pipeline having a stub section of pipeline connected thereto, the method comprising positioning the end portion of the lateral pipeline to cross the main pipeline at a known distance from the end of the stub line, measuring the horizontal angle between the longitudinal axes of the main and lateral pipelines, raising the end portion of the lateral pipeline above the surface of the water, constructing a tie-in assembly designed in accordance with the measured angle and said known distance to have the necessary length and configuration to extend between the end of the lateral pipeline and the end of the stub line when the lateral pipeline has been lowered back to the bottom of the water, shortening the lateral pipeline as required for connecting to the tie-in assembly, connecting one end of the tie-in assembly to the end of the lateral pipeline, lowering the end portion of the lateral pipeline and the connected tie-in assembly into position in the water with the other end of the tie-in assembly adjacent the end of the stub line, and connecting the end of the stub pipeline to said other end of the tie-in assembly.

5. The method of claim 4 including the further step of measuring the vertical angle the lateral pipeline makes with the main pipeline at the intersection of the main and lateral lines for use with the measured horizontal angle in the construction of the tie-in assembly.

6. The method of claim 4 in which the angle measuring step includes measuring the distance from a reference point on the lateral pipeline to the point of intersection of the main and lateral pipelines and to a reference point on the main pipeline a known distance from the point of intersection to obtain three sides of a triangle from which the horizontal angle between the main and lateral pipelines can be determined.

* * * * *